United States Patent
Ryu et al.

(12)

(10) Patent No.: US 10,483,570 B2
(45) Date of Patent: Nov. 19, 2019

(54) FUEL CELL AND METHOD FOR OPERATING THE SAME

(71) Applicant: LG ELECTRONICS INC., Seoul (KR)

(72) Inventors: Choonjae Ryu, Seoul (KR); Dongkeun Yang, Seoul (KR); Hyoungsuk Woo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/607,131

(22) Filed: May 26, 2017

(65) Prior Publication Data

US 2017/0346115 A1     Nov. 30, 2017

(30) Foreign Application Priority Data

May 30, 2016   (KR) .................. 10-2016-0066712

(51) Int. Cl.
*H01M 8/04*     (2016.01)
*H01M 8/04746*  (2016.01)
(Continued)

(52) U.S. Cl.
CPC ..... *H01M 8/04753* (2013.01); *H01M 8/0432* (2013.01); *H01M 8/04089* (2013.01);
(Continued)

(58) Field of Classification Search
CPC ......... H01M 8/04753; H01M 8/04619; H01M 8/0432; H01M 8/04197; H01M 8/04201;
(Continued)

(56) References Cited

U.S. PATENT DOCUMENTS

| | | |
|---|---|---|
| 5,677,073 A | 10/1997 | Kawatsu |
| 5,935,726 A | 8/1999 | Chow et al. |

(Continued)

FOREIGN PATENT DOCUMENTS

| | | |
|---|---|---|
| EP | 0971428 | 1/2000 |
| JP | 03-011559 | 1/1991 |

(Continued)

OTHER PUBLICATIONS

Extended European Search Report in European Application No. 17172471.9, dated Jul. 13, 2017, 8 pages (with English translation).

*Primary Examiner* — Cynthia K Walls
(74) *Attorney, Agent, or Firm* — Fish & Richardson P.C.

(57) ABSTRACT

A fuel cell has a stack that includes a fuel electrode and air electrode on opposite sides of an electrolyte membrane. The fuel electrode includes first and second fuel ports communicative via a fuel flow path, and the air electrode includes first and second air ports communicative via an air flow path. The fuel cell also includes first and second fuel feeders communicative with the first and second fuel ports, and first and second air feeders communicative with the first and second air ports. The fuel cell also includes a fuel switching unit between the first and second fuel feeders that switches a fuel supply direction between the first and second fuel feeders. The fuel cell further includes an air switching unit between the first and second air feeders that switches an air supply direction between the first and second air feeders.

11 Claims, 12 Drawing Sheets

(51) Int. Cl.
*H01M 8/04082* (2016.01)
*H01M 8/04186* (2016.01)
*H01M 8/04089* (2016.01)
*H01M 8/0432* (2016.01)
*H01M 8/04537* (2016.01)
*H01M 8/04119* (2016.01)

(52) U.S. Cl.
CPC ... *H01M 8/04186* (2013.01); *H01M 8/04197* (2016.02); *H01M 8/04201* (2013.01); *H01M 8/04619* (2013.01); *H01M 8/04179* (2013.01)

(58) Field of Classification Search
CPC ......... H01M 8/04186; H01M 8/04089; H01M 8/04179
See application file for complete search history.

(56) References Cited

U.S. PATENT DOCUMENTS

| | | | |
|---|---|---|---|
| 6,159,629 | A | 12/2000 | Gibb et al. |
| 2003/0049503 | A1* | 3/2003 | Ballantine ......... H01M 8/04089 429/432 |
| 2004/0229087 | A1 | 11/2004 | Senner et al. |
| 2006/0257710 | A1 | 11/2006 | Kato |
| 2007/0077462 | A1 | 4/2007 | Warner et al. |

FOREIGN PATENT DOCUMENTS

| | | |
|---|---|---|
| JP | 2007059105 | 3/2007 |
| JP | 2008-269910 | 11/2008 |
| KR | 10-2011-0042097 | 4/2011 |

* cited by examiner

FUEL CELL AND METHOD FOR OPERATING THE SAME

CROSS-REFERENCE TO RELATED APPLICATION

Pursuant to 35 U.S.C. § 119(a), this application claims the benefit of an earlier filing date of and the right of priority to Korean Application No. 10-2016-0066712, filed on May 30, 2016, the contents of which are incorporated by reference herein in its entirety.

TECHNICAL FIELD

This disclosure generally relates to a fuel cell.

BACKGROUND

Generally, fuel cells are under development to replace existing fossil fuels with eco-friendly energy. Fuel cells, such as home fuel cells for supplying electric power to home, fuel cells for electric vehicles, fuel cells for portable terminals and notebook computers, and fuel cells for supplying electric power in a portable manner at home, are being studied and developed in various application fields.

Fuel cells are typically classified, according to a type of electrolyte, into phosphoric acid fuel cell (PAFC), alkaline fuel cell (AFC), proton exchange membrane fuel cell (PEMFC), molten carbonate fuel cell (MCFC), solid oxide fuel cell (SOFC), direct methanol fuel cell (DMFC), direct borohydride fuel cell (DMFC) and the like.

Operating temperatures of these fuel cells are usually about 200° C. for the phosphoric acid type, 60-110° C. for the alkali type, room temperature to 80° C. for the polymer electrolyte type, 500 to 700° C. for the molten carbonate electrolyte type, high temperature over 1000° C. for the solid oxide type and 25 to 130° C. for the direct methanol type.

In most cases, unlike typical batteries (secondary batteries), a fuel cell supplies fuel (hydrogen gas or hydrocarbon) and oxygen to a fuel electrode (anode) and an air electrode (cathode), respectively, which form a stack, thereby inducing an electrochemical reaction between the hydrogen and the oxygen without a burning (oxidation) reaction. An energy difference between states before and after the electrochemical reaction is then directly converted into electric energy.

SUMMARY

Implementations disclosed herein provide a fuel cell configured to adaptively switch a flow direction of fuel or air within a stack of the fuel cell.

In one aspect, a fuel cell may include a stack. The stack may include an electrolyte membrane, and a fuel electrode disposed on a first side of the electrolyte membrane. The fuel electrode may include a first fuel port and a second fuel port that are communicative with each other via a fuel flow path. The stack may also include an air electrode disposed on a second side, opposite the first side, of the electrolyte membrane. The air electrode may include a first air port and a second air port that are communicative with each other via an air flow path. The fuel cell may also include a first fuel feeder communicative with the first fuel port; a second fuel feeder communicative with the second fuel port; a first air feeder communicative with the first air port; and a second air feeder communicative with the second air port. The fuel cell may also include a fuel switching unit provided between the first fuel feeder and the second fuel feeder and configured to switch a fuel supply direction to a first direction from the first fuel feeder to the second fuel feeder, or reversely to a second direction from the second fuel feeder to the first fuel feeder. The fuel cell may further include an air switching unit provided between the first air feeder and the second air feeder and configured to switch an air supply direction to a third direction from the first air feeder to the second air feeder, or reversely to a fourth direction from the second air feeder to the first air feeder.

In some implementations, the first fuel feeder and the second fuel feeder may share at least a portion of a flow path, and the fuel switching unit may be located on the at least the portion of the flow path shared by the first fuel feeder and the second fuel feeder.

In some implementations, the first fuel port of the stack may be connected to a first end of a first fuel pipe, and the second fuel port of the stack may be connected to a first end of a second fuel pipe. A first fuel switching valve may be provided on a second end of the first fuel pipe and a first fuel supply pipe and a second fuel discharge pipe may be connected to the first fuel switching valve. A second fuel switching valve may be provided on a second end of the second fuel pipe and a second fuel supply pipe and a first fuel discharge pipe may be connected to the second fuel switching valve.

In some implementations, the first fuel supply pipe and the second fuel supply pipe may be connected to a fuel supply valve that is configured to selectively direct a fuel supply direction. The first fuel discharge pipe and the second fuel discharge pipe may be connected to a fuel discharge valve that is configured to selectively direct a fuel discharge direction. The fuel supply valve and the fuel discharge valve may be configured to be jointly controlled.

In some implementations, the first air feeder and the second air feeder may share at least a portion of a flow path. The air switching unit may be located on the at least the portion of the flow path shared by the first air feeder and the second air feeder.

In some implementations, the first air port of the stack may be connected to a first end of a first air pipe, and the second air port of the stack may be connected to a first end of a second pipe. A first air switching valve may be provided on a second end of the first air pipe, and a first air supply pipe and a second air discharge pipe may be connected to the first air switching valve. A second air switching valve may be provided on a second end of the second air pipe, and a second air supply pipe and a first air discharge pipe may be connected to the second air switching valve.

In some implementations, the first air supply pipe and the second air supply pipe may be connected to an air supply valve that is configured to selectively direct an air supply direction. The first air discharge pipe and the second air discharge pipe may be connected to an air discharge valve that is configured to selectively direct an air discharge direction. The air supply valve and the air discharge valve may be configured to be jointly controlled.

In some implementations, the stack may be provided with a cooling unit at an outside thereof, and the cooling unit may be configured to be controlled to cooperatively operate with at least one of the fuel switching unit or the air switching unit.

In another aspect, a fuel cell may include a stack provided with a fuel electrode having a first fuel port and a second fuel port, and an air electrode having a first air port and a second air port. The fuel cell may also include a first feeder connected to the first fuel port and the first air port; and a second feeder connected to the second fuel port and the second air port. The fuel cell may further include at least one processor electrically connected to the first feeder and the second feeder to and configured to switch a fuel supply direction and an air supply direction to a direction toward the first feeder or the second feeder.

In some implementations, the fuel cell may further include a load variation detecting unit configured to detect a variation of a load that is applied to the stack. The load variation detecting unit may be electrically connected to the at least one processor and may be configured to cooperatively operate with at least one of the fuel switching unit or the air switching unit.

In some implementations, the fuel cell may further include a temperature detecting unit configured to detect heat generated from the stack. The temperature detecting unit may be electrically connected to the at least one processor and configured to cooperatively operate with at least one of the fuel switching unit or the air switching unit.

In some implementations, the fuel cell may further include a timer configured to determine a time during which the fuel or the air is supplied from the fuel switching unit or the air switching unit in a corresponding direction. The timer may be electrically connected to the at least one processor and is configured to cooperatively operate with at least one of the fuel switching unit or the air switching unit.

In some implementations, the fuel cell may further include a flow channel including at least one pipe connected in a closed loop shape to an inlet and to an outlet of the stack, the at least one pipe configured to supply or discharge the fuel.

In some implementations, the fuel cell may further include a switching valve that is provided at a middle portion of the flow channel including the at least one pipe. The switching valve may be configured to control the fuel supply direction and a fuel discharge direction.

In some implementations, the fuel cell may further include an air supply unit configured to: supply air in the stack; and switch the air supply direction under control of the at least one processor.

In another aspect, a method for operating a fuel cell may include supplying fuel and air in a first direction into a fuel flow path and an air flow path provided within a stack of the fuel cell; and switching a direction in which at least one of the fuel or the air is supplied into the fuel flow path from the first direction to a second direction that is opposite to the first direction.

In some implementations, the method may further include determining whether to switch at least one of the a supply direction or an air supply direction within the stack; and, based on a determination to switch the at least one of the fuel supply direction or the air supply direction, switching the at least one of the fuel supply direction or the air supply direction.

In some implementations, determining whether to switch the at least one of the fuel supply direction or the air supply direction within the stack may include: detecting at least one of a stack temperature or a variation of a load applied to the stack; and based on the detected stack temperature or the detected variation of the load applied to the stack, determining an updated direction for at least one of the fuel supply direction or the air supply direction into the stack.

In some implementations, determining whether to switch the at least one of the fuel supply direction or the air supply direction within the stack may include: determining a duration of time during which the fuel supply direction or the air supply direction corresponds to a first direction; and based on the duration of time during which the fuel supply direction or the air supply direction corresponds to the first direction, determining a second direction for at least one of the fuel supply direction or the air supply direction.

Further scope of applicability of the present disclosure will become more apparent from the detailed description given hereinafter. However, it should be understood that the detailed description and specific examples are given by way of illustration only, and that various changes and modifications within the spirit and scope of the disclosure may be made.

DETAILED DESCRIPTION

Figure 1:
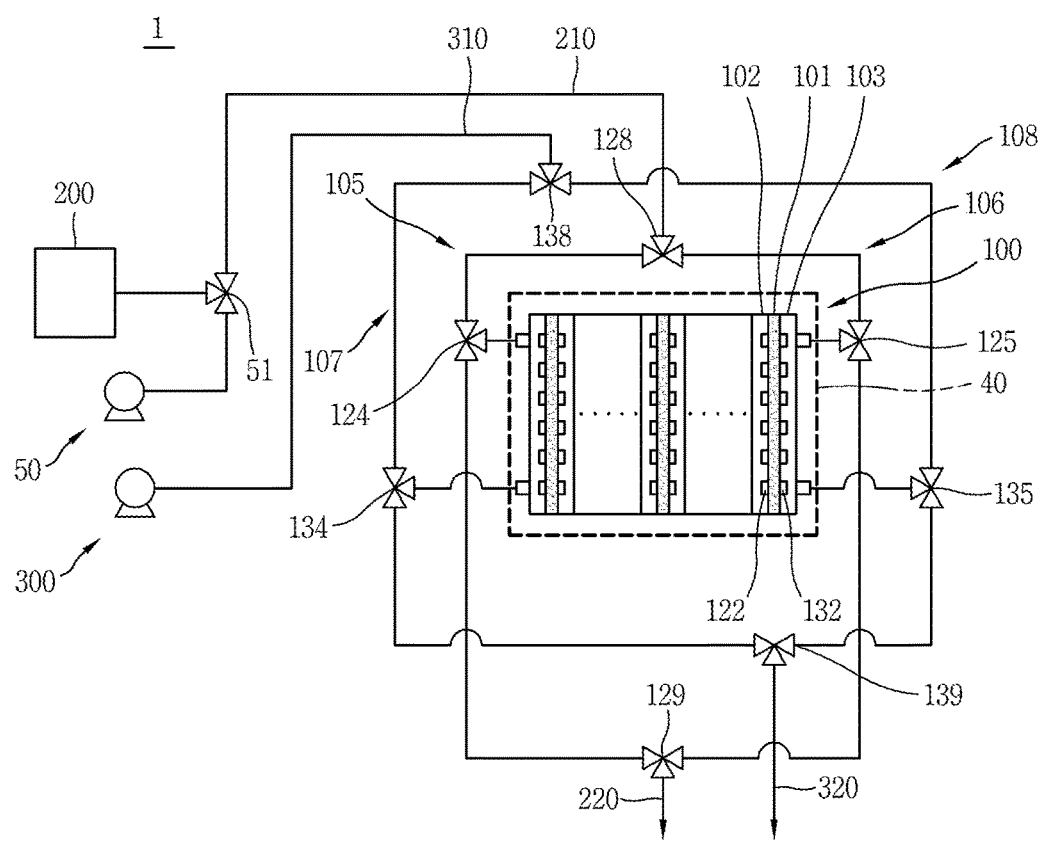
FIG. 1 is a diagram illustrating an example of an implementation of a fuel cell.

Implementations are disclosed that provide a fuel cell, and more particularly, a fuel cell configured to adaptively switch supply directions of fuel and air supplied to a fuel cell stack, and a method for operating the same.

A fuel cell stack may be formed by stacking a plurality of unit cells. Each unit cell includes a fuel electrode and an air electrode that are interposed with an electrolyte membrane stacked therebetween. In some scenarios, the fuel electrode is designed with a narrow and complicated flow path designed to evenly disperse the supplied fuel to the entire area of the fuel cell. Accordingly, when the fuel cell operates for a long period of time, impurities may be accumulated in the flow path of the fuel electrode, and thereby the flow path may be blocked due to the impurities.

In some scenarios, even if impurities are not substantially accumulated in an inlet side of the fuel electrode, a larger amount of impurities may be accumulated toward an outlet side. In such scenarios, a reaction area of fuel and air decreases at the outlet side of the fuel electrode, which causes lowering of energy efficiency.

In view of this, a fuel cell may be designed to remove impurities by supplying purge gas periodically while a system is stopped or by washing the fuel electrode by supplying nitrogen for a predetermined period of time upon starting the system. However, in such designs, the system would be stopped for the predetermined period of time to remove the impurities, which may result in an operation time that is shortened and an energy efficiency that is lowered accordingly.

In addition, as described above, a fuel cell may generate heat while hydrogen and oxygen operating as the fuel react with each other. As such, the temperature at the outlet side of the flow path (air electrode) increases due to the heat generated during the reaction and due to a continuous flow of fluid. Accordingly, the temperature at the outlet side of the air electrode may be locally increased, which may cause the electrolyte membranes of some unit cells to malfunction. If the electrolyte membrane malfunctions, the unit cell may need to be replaced or, in severe cases, use of the entire stack may be restricted. This may result in lowering of the energy efficiency.

In some scenarios, a fuel cell may be provided with an air-cooling or water-cooling type cooling device, which cools the entire stack. However, such cooling devices may not be suitable for cooling a locally heated portion, and may instead perform cooling even for non-heated portions. As a result, the stack may not be maintained at a proper temperature and the operation efficiency may be lowered.

To address such challenges, implementations described herein provide a fuel cell that is configured so that the flow directions of fuel and air may be switched so that impurities accumulated in the stack may be removed without stopping an operation. As such, during operation, energy may be generated even during the removal of the impurities, thereby enhancing energy efficiency of the fuel cell.

Also, the efficiency of the fuel cell may be further improved by removing impurities while detecting (e.g., in real time) whether impurities are accumulated, for example by implementing a temperature sensor, a timer, a wattmeter, or other suitable device for detecting and checking for impurities.

In addition, the fuel cell may be configured to adaptively switch the air supply direction as needed, and the stack may be cooled to an appropriate temperature or locally cooled without stopping operation of the fuel cell, thereby improving performance of the stack.

In some implementations, the fuel cell may be configured to remove impurities accumulated in a stack without necessarily stopping an operation of the fuel cell. As such, the fuel cell may be configured to produce electricity even during a process of removing impurities. The fuel cell may be configured to increase efficiency thereof by removing impurities in a manner of checking in real time how much impurities have been accumulated.

In some implementations, a fuel cell may be configured to cool a stack down to a proper temperature even without stopping an operation of the fuel cell. The fuel cell may be configured to cool a stack locally at specific locations.

To achieve these and other advantages, as described herein, a fuel cell is provided that supplies a hydrocarbon-based fuel, and which is configured to prevent an accumulation of impurities in a stack by switching a supply direction of fuel from an inlet to an outlet, or by switching the supply direction of fuel from the outlet to the inlet.

In some implementations, a pipe for supplying or discharging the fuel may be connected to an inlet and an outlet of the stack in a closed loop shape. A switching valve for controlling a fuel supply direction and a fuel discharge direction may be installed in a middle of the pipe.

Further, an air supply unit for supplying air in the stack may be provided, which may be configured to switch an air supply direction under control of at least one processor, such as a controller.

Description will now be given of some examples of a fuel cell and a method for operating the same, according to some implementations. However, the present disclosure is not limited to these examples.

FIG. 1 is a schematic view illustrating an implementation of a fuel cell.

As illustrated in FIG. 1, fuel cell 1 may be constituted as a direct methanol type fuel cell that generates electrical energy by direct reaction between methanol and oxygen, or a direct oxide type fuel cell in which a liquid or gaseous fuel containing hydrogen, such as ethanol, LPG, LNG, gasoline, butane gas and the like, reacts with oxygen. Also, the fuel cell may be constituted as a polymer electrolyte fuel cell in which a fuel is reformed into gas containing hydrogen for use, or constituted as a phosphoric acid fuel cell, an alkaline fuel cell, a molten carbonate fuel cell, or a solid oxide fuel cell.

The fuel that is used in the fuel cell 1 is referred to as a hydrocarbon-based fuel such as methanol, ethanol, natural gas, LPG or the like, which is in a liquid or gaseous state.

The fuel cell 1 according to the implementation may include a fuel cell stack 100 that generates power using fuel and air, a fuel supply unit 200 that supplies the fuel to the fuel cell stack 100, and an air supply unit 300 that supplies the air into the fuel cell stack 100.

The fuel cell stack 100 may be constituted only by one unit cell, but may generally be constituted by stacking a plurality of unit cells in a row.

The unit cell may include an electrolyte membrane (e.g., membrane electrode assembly (MEA)) 101, a first separator (e.g., fuel electrode 102) disposed on one side of the electrolyte membrane 101 to form a fuel electrode, and a second separator (e.g., air electrode 103) disposed on an opposite side of the fuel electrode with the electrolyte membrane 101 interposed therebetween to form an air electrode. That is, one separator is provided with a fuel flow path to be explained later on one side thereof and an air flow path to be explained later on another side thereof, and fuel inlet/outlet ports and air inlet/outlet ports are independently formed at positions without communicating with each other. Accordingly, the fuel inlet/outlet ports communicate with the fuel flow path without communicating with the air flow path, while the air inlet/outflow ports communicate with the air flow path without communicating with the fuel flow path. Hereinafter, for the sake of explanation, the separator will be described by defining the fuel flow path side as the fuel electrode and the air flow path side as the air electrode.

Figure 2:
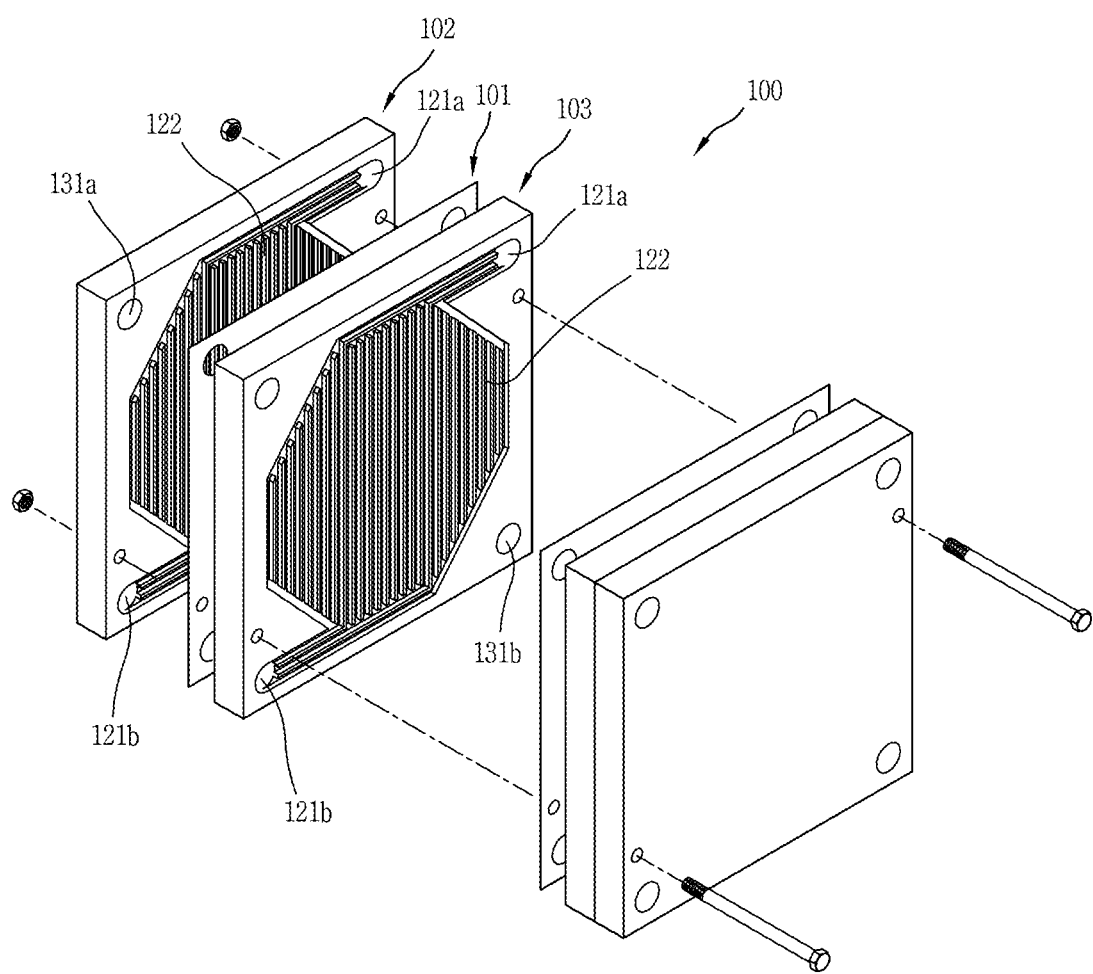
FIG. 2 is diagram illustrating an example of a fuel cell stack including unit cells.

FIG. 2 is a disassembled perspective view illustrating a fuel cell stack including unit cells.

As illustrated in FIGS. 1 and 2, a fuel electrode 102 may have a first fuel inlet/outlet port 121*a* and a second fuel inlet/outlet port 121*b*, which may serve as a fuel inlet or a fuel outlet depending on a direction in which the fuel is supplied. The first fuel inlet/outlet port 121*a* and the second fuel inlet/outlet port 121*b* communicate with both ends of a fuel flow path 122, respectively. The fuel flow path 122 may be formed in a zigzag shape or in a shape of a plurality of parallel flow paths so that the fuel may be widely diffused into the electrolyte membrane 101. The zigzag shape or the plural-flow path shape of the fuel flow path 122 may have a narrow cross-sectional area.

Here, a first fuel feeder 105 may be connected to the first fuel inlet/outlet port 121*a* and a second fuel feeder 106 may be connected to the second fuel inlet/outlet port 121*b* to control the fuel supply direction, respectively.

The first fuel feeder 105 and the second fuel feeder 106 are configured to have the fuel supply directions opposite to each other. For example, the first fuel feeder 105 supplies the fuel from the first fuel inlet/outlet port 121a to the second fuel inlet/outlet port 121b, while the second fuel feeder 107 supplies the fuel from the second fuel inlet/outlet port 121b to the first fuel inlet/outlet port 121a.

Figure 3:
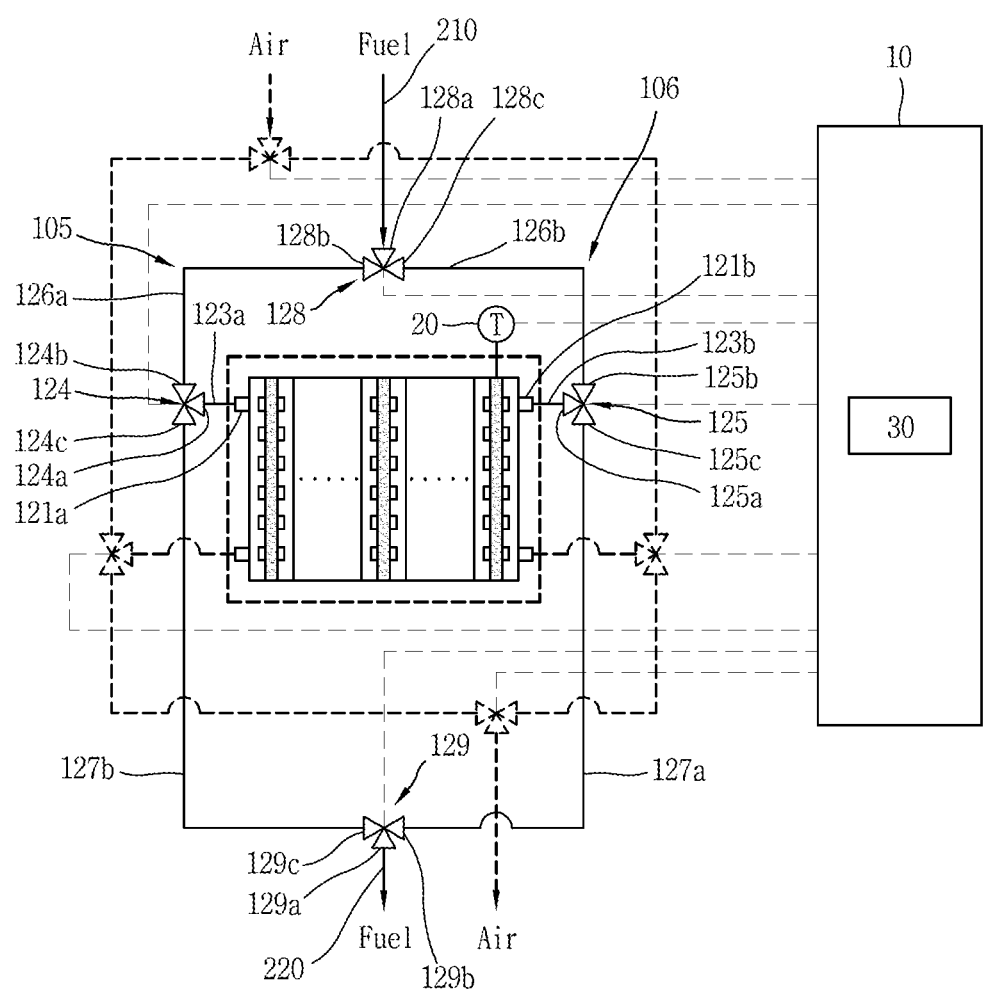
FIG. 3 is a diagram illustrating an example of a fuel feeder for switching a supply direction of a fuel, in the fuel cell stack according to FIG. 1.

As an example, when there are two first fuel inlet/outlet ports 121a and two second fuel inlet/outlet ports 121b, the first fuel feeder 105 and the second fuel feeder 106 may be configured to form completely independent flow paths. As illustrated in FIG. 3, when the first fuel inlet/outlet port 121a and the second fuel inlet/outlet port 121b are each provided as a single port, the first fuel feeder 105 and the second fuel feeder 106 may preferably be configured to share a partial section. In some scenarios, this may reduce a total number of components in the fuel cell.

FIG. 3 is a schematic view illustrating a fuel feeder for switching a fuel supply direction, in the fuel cell stack according to FIG. 1.

As illustrated in FIG. 3, when the fuel cell according this implementation is provided with a single first fuel inlet/outlet port 121a and a single second fuel inlet/outlet port 121b, one end of a first fuel inlet/outlet pipe 123a may be connected to the first fuel inlet/outlet port 121a, and one end of a second fuel inlet/outlet pipe 123b may be connected to the second fuel inlet/outlet port 121b.

A first fuel switching valve 124 may be disposed at another end of the first fuel inlet/outlet pipe 123a, and a first fuel supply pipe 126a and a second fuel discharge pipe 127b may be connected to the first fuel switching valve 124, respectively. Some examples of these valves are described below, although implementations are not limited thereto.

The first fuel switching valve 124 may be configured as a three-way valve so that the first fuel inlet/outlet pipe 123a is connected to a first switching hole 124a, the first fuel supply pipe 126a is connected to a second switching hole 124b, and the second fuel discharge pipe 127b is connected to a third switching hole 124c.

A second fuel switching valve 125 may be provided at another end of the second fuel inlet/outlet pipe 123b, and a second fuel supply pipe 126b and a first fuel discharge pipe 127a may be connected to the second fuel switching valve 125, respectively.

The second fuel switching valve 125 may be configured as a three-way valve so that the second fuel inlet/outlet pipe 123b is connected to a first switching hole 125a, the second fuel supply pipe 126b is connected to a second switching hole 125b, and the first fuel discharge pipe 127a is connected to a third switching hole 125c.

In some implementations, a fuel supply valve 128 may be provided between the first fuel supply pipe 126a and the second fuel supply pipe 126b, and a fuel discharge valve 129 may be provided between the first fuel discharge pipe 127a and the second fuel discharge pipe 127b.

The fuel supply valve 128 may be configured as a three-way valve so that a first supply hole 128a thereof is connected to a fuel supply line 210 and the first fuel supply pipe 126a is connected to a second supply hole 128b, and the second fuel supply pipe 126b is connected to a third supply hole 128c.

The fuel discharge valve 129 may be configured as a three-way valve so that a first discharge hole 129a is connected to a fuel discharge line 220, the first fuel discharge pipe 127a is connected to a second discharge hole 129b, and the second fuel discharge pipe 127b is connected to a third discharge hole 129c, respectively.

Meanwhile, the fuel supply valve 128, the fuel discharge valve 129, the first fuel switching valve 124 and the second fuel switching valve 125 according to this implementation may all be electrically connected to at least one processor, such as controller 10, and accordingly, switching directions of those valves may be controlled by the controller 10.

For example, when a fuel (hydrogen) is supplied in a direction of the first fuel feeder 105, the controller 10 controls the fuel supply valve 128 to communicate the first supply hole 128a with the second supply hole 128b, controls the first fuel switching valve 124 to communicate the second switching hole 124b with the first switching hole 124a, controls the second fuel switching valve 125 to communicate the first switching hole 125a with the third switching hole 125c, and the fuel discharge valve 129 to communicate the second discharge hole 129b with the first discharge hole 129a.

Figure 4A:
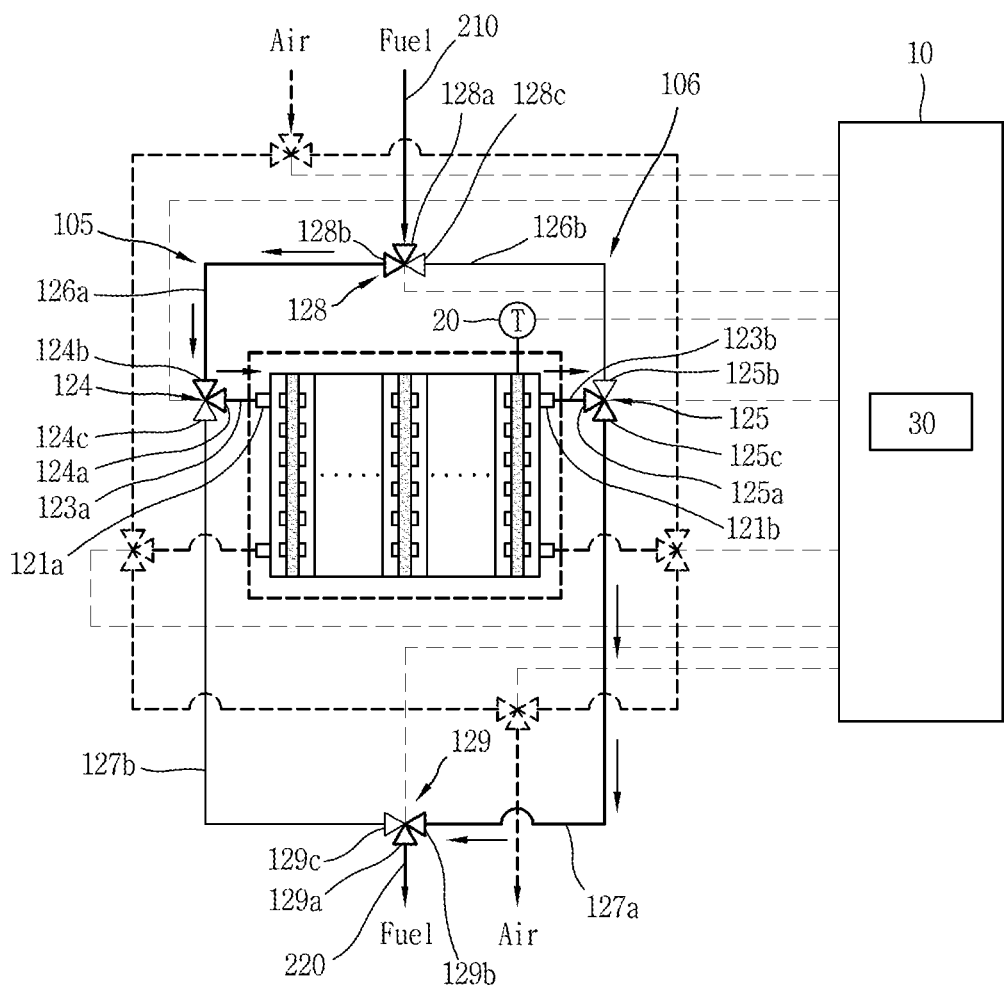
FIGS. 4A and 4B are diagrams illustrating examples of a supply direction of the fuel in the fuel feeder of the stack according to FIG. 3.

Accordingly, the fuel flows from a fuel supply unit 200 into the first fuel inlet/outlet port 121a via the first fuel supply pipe 126a and the first fuel inlet/outlet pipe 123a along arrows in FIG. 4A. The fuel then moves toward the second fuel inlet/outlet port 121b along the fuel flow path 122 of the stack 100. The fuel is accordingly discharged into the fuel discharge line 220 via the second fuel inlet/outlet pipe 123b and the first fuel discharge pipe 127a. This series of processes is repeatedly executed.

In some implementations, a temperature of the stack 100 may be detected by a temperature sensor 20 provided in the fuel cell stack 100. When the detected value increases over a threshold value, the controller 10 may switch the fuel supply direction.

For example, when the temperature of the stack detected by the temperature sensor 20 rises above the preset temperature, the controller 10 determines that the flow path is narrowed due to accumulation of impurities in the fuel flow path 122. Accordingly, the controller 10 switches an opening/closing direction of each valve, to switch the fuel supply direction into a direction of the second fuel feeder 106 as illustrated in FIG. 4B.

Figure 4B:
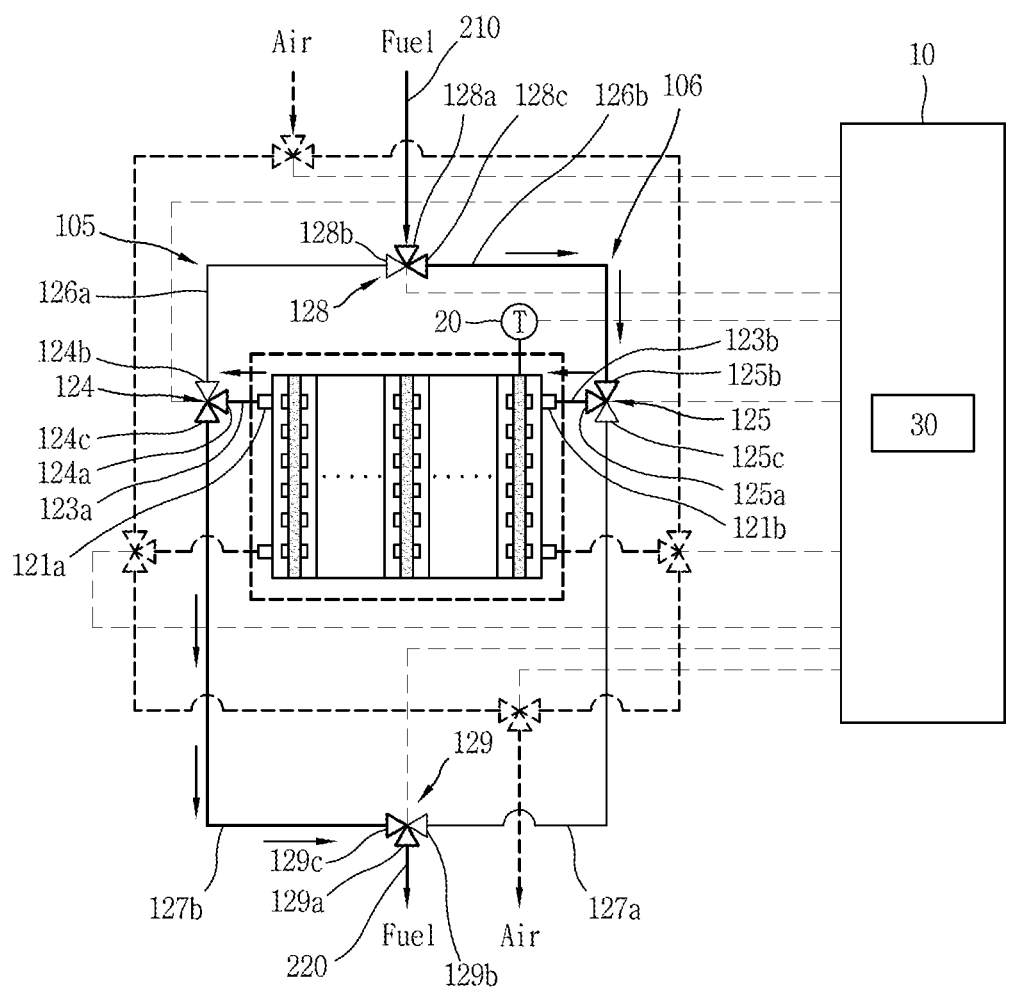

Accordingly, the fuel is supplied in a direction opposite to that of FIG. 4A and moves along arrows in FIG. 4B. Thus, the impurities accumulated near the second fuel inlet/outlet port 121b of the fuel flow path 122 are pushed by the fuel introduced into the second fuel inlet/outlet port 121b. The impurities then flow toward the first fuel inlet/outlet port 121a. During the flow, impurities are better removed from the fuel flow path 122 or at least are better prevented from blocking the fuel flow path 122. This may mitigate a local increase in the temperature near the second fuel inlet/outlet port 121b of the stack 100, thereby preventing a reduction of a lifetime of the stack or degradation of performance of the stack.

Here, the controller 10, as aforementioned, may control the fuel supply direction by controlling an opening direction of each valve based on the temperature of the stack 100 detected by the temperature sensor 20, but, in some cases, may control the fuel supply direction to be periodically switched by using a timer 30 provided in the controller 10.

Further, the fuel cell according to this implementation may further include an additional cooling device depending on an operating manner thereof.

For example, when a rated output operation is utilized more than a high power operation, the temperature of the stack may be kept constant by using a separate cooling device without changing an air flow direction. As illustrated in FIG. 1, the cooling device 40 may continuously supply cooling water to a housing surrounding the stack 100 to constantly maintain the temperature of the stack 100.

In some implementations, the fuel cell stack 100 applied to a high power operation may be provided with a purge device 50 for removing impurities by supplying purge gas to the fuel flow path 122 of the stack. In this instance, the fuel flow path 122 may be maintained in a relatively clean state at all times, and thus local overheating due to impurities may be mitigated. However, if scenarios where the temperature difference between the unit cells due to the high output operation is greater than the difference in the rated power operation, it may be preferable to supply air in an intersecting (crossing) manner using an air supply unit to be explained later. In some implementations, the fuel cell may also include a purge switching valve 51.

Hereinafter, another implementation of a fuel cell according to the present disclosure will be described.

Figure 5:
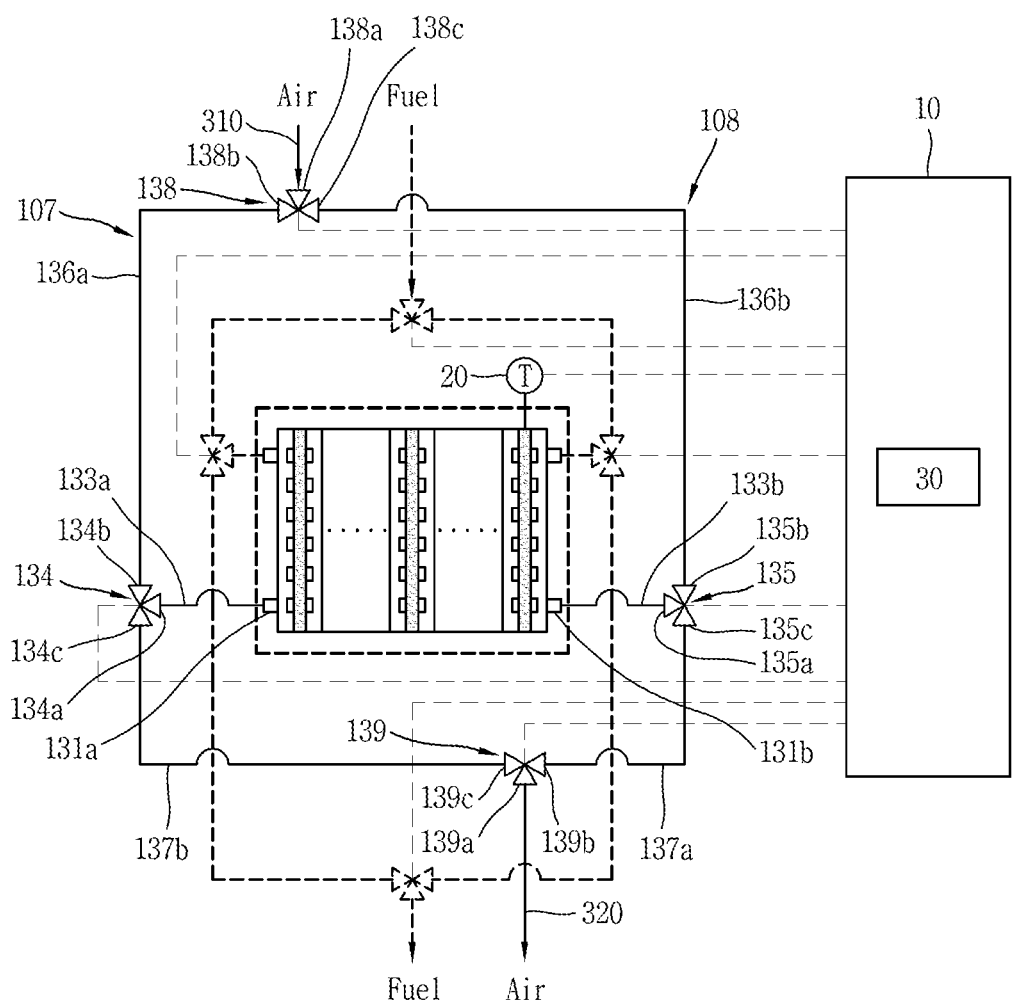
FIG. 5 is a diagram illustrating an example of an air feeder for switching a supply direction of air in the fuel cell stack according to FIG. 1.

In the above-described implementations, the supply direction of the fuel is changed to mitigate local overheating of the stack. However, in the implementations described below, the stack is cooled to be maintained at a particular temperature by switching an air supply direction, while maintaining the fuel supply direction in one direction. As illustrated in FIG. 5, an air supply unit for the air electrode 103 of the fuel cell according to this implementation may be configured similar to the fuel supply unit of the fuel electrode 102.

FIG. 5 is a schematic view illustrating an air feeder for switching an air supply direction in the fuel cell stack according to FIG. 1.

As illustrated in FIG. 5, a first air feeder 107 may be connected to a first air inlet/outlet port 131a and a second feeder 108 may be connected to a second air inlet/outlet port 131b, respectively, so as to control an air supply direction.

The first air feeder 107 and the second air feeder 108 may be configured to have air supply directions opposite to each other. For example, the first air feeder 107 supplies air from the first air inlet/outlet port 131a to the second air inlet/outlet port 131b, while the second air feeder 107 supplies air from the second air inlet/outlet port 131b to the first air inlet/outlet port 131a.

For this purpose, when a number of the first air inlet/outlet port 131a and a number of the second air inlet/outlet port 131b are two, respectively, the first air feeder 107 and the second air feeder 108 may form completely independent flow paths of each other. On the other hand, as illustrated in FIG. 5, when a single first air inlet/outlet port 131a and a single second air inlet/outlet port 131b are provided, the first air feeder 107 and the second air feeder 108 may preferably be configured to share a partial section with each other. In some scenarios, this may reduce a total number of components in the fuel cell.

When a single first air inlet/outlet port 131a and a single second air inlet/outlet port 131b are provided, one end of a first air inlet/outlet pipe 133a may be connected to the first air inlet/outlet port 131a, and one end of the second air inlet/outlet pipe 133b may be connected to the second air inlet/outlet port 131b.

A first air switching valve 134 may be provided at another end of the first air inlet/outlet pipe 133a and a first air supply pipe 136a and a second air discharge pipe 137b may be connected to the first air switching valve 134, respectively.

A first air switching valve 134 may be configured as a three-way valve so that the first air inlet/outlet pipe 133a is connected to a first switching hole 134a, the first air supply pipe 136a is connected to a second switching hole 134b, and the second air discharge pipe 137b is connected to a third switching hole 134c.

A second air switching valve 135 may be provided at another end of the second air inlet/outlet pipe 133b. A second air supply pipe 136b and a first air discharge pipe 137a may be connected to the second air switching valve 135.

The second air switching valve 135 may be configured as a three-way valve so that the second air inlet/outlet pipe 133b is connected to a first switching hole 135a, a second air supply pipe 136b is connected to a second switching hole 135b, and the first air discharge pipe 137a is connected to a third switching hole 135c.

An air supply valve 138 may be provided between the first air supply pipe 136a and the second air supply pipe 136b and an air discharge valve 139 may be provided between the first air discharge pipe 137a and the second air discharge pipe 137b.

The air supply valve 138 may be configured as a three-way valve so that an air supply line 310 is connected to a first supply hole 138a, the first air supply pipe 136a is connected to a second supply hole 138b, and the second air supply pipe 136b is connected to a third supply hole 138c.

The air discharge valve 139 may be configured as a three-way valve so that an air discharge line 320 is connected to a first discharge hole 139a, the first air discharge pipe 137a is connected to the second discharge hole 139b, and the second air discharge pipe 137b is connected to a third discharge hole 139c.

Meanwhile, the air supply valve 138, the air discharge valve 139, the first air switching valve 134 and the second air switching valve 135 according to this implementation may all be electrically connected to the controller 10, and opening and closing directions of those valves may be controlled by the controller 10.

For example, when the air is supplied in a direction of the first air feeder 107, the controller 10 controls the air supply valve 138 to communicate the first supply hole 138a with the second supply hole 138b, controls the second air switching valve 135 to communicate the first switching hole 135a with the third switching hole 135c, and controls the air discharge valve 139 to communicate the second discharge hole 139b with the first discharge hole 139a.

Figure 6A:
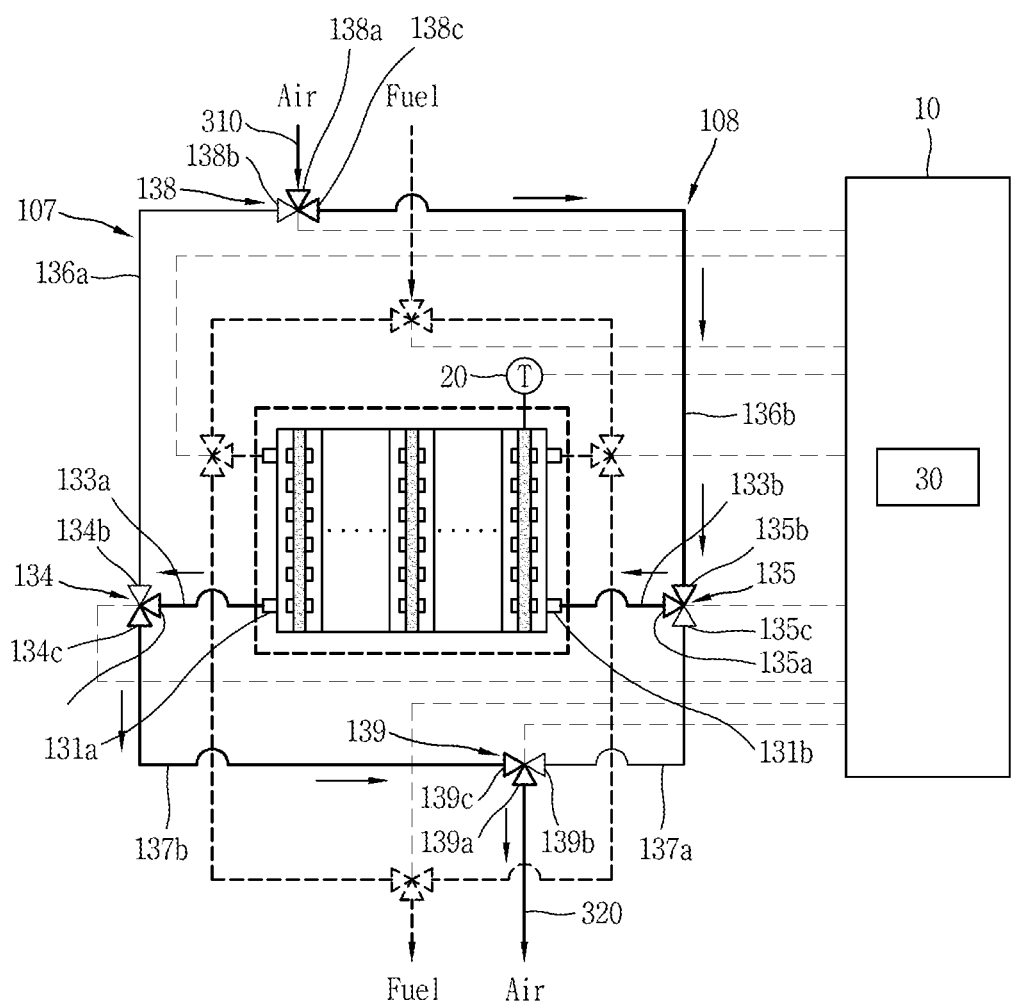
FIGS. 6A and 6B are diagrams illustrating examples of the supply direction of the air in the air feeder of the stack according to FIG. 5.

Accordingly, in this example, the air flows from an air supply unit 300 into the first air inlet/outlet port 131a via the first air supply pipe 136a and the first air inlet/outlet pipe 133a along arrows in FIG. 6A. The air is then directed to the second air inlet/outlet port 131b along the air flow path 132 of the stack 100. The air is then discharged into the air discharge line 320 via the second air inlet/outlet pipe 133b and the first air discharge pipe 137a. This series of processes is repeatedly carried out.

However, a temperature of the stack may be detected by a temperature sensor provided in the fuel cell stack according to this implementation. When the detected value increases over a preset value, the controller may switch the air supply direction.

For example, when the temperature of the stack detected by the temperature sensor rises above the preset temperature, the controller switches the opening/closing direction of each valve to switch the air supply direction toward the second air feeder as illustrated in FIG. 6A.

Figure 6B:
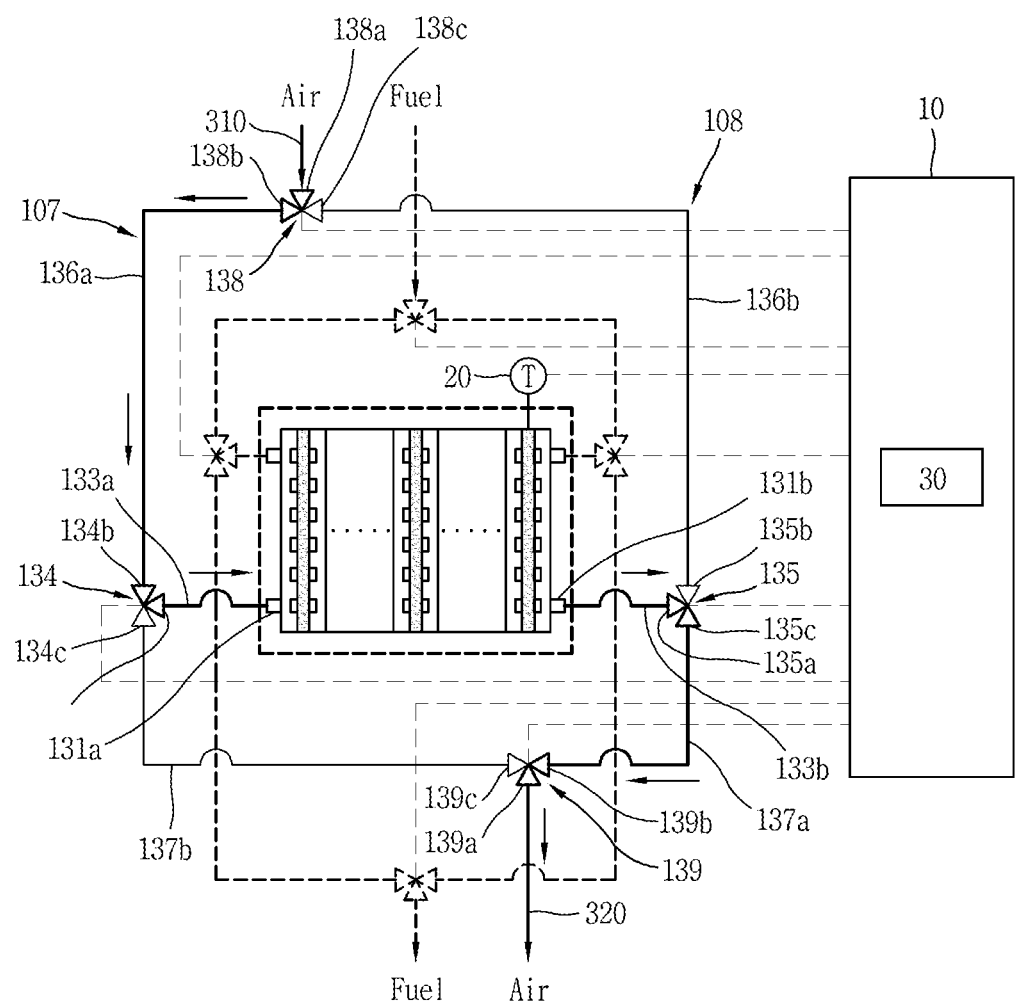

Accordingly, the air is supplied in a direction opposite to that of FIG. 6A and moves along the arrows in FIG. 6B. This may mitigate a local temperature increase of the stack, thereby preventing a reduction of a lifetime of the stack or degradation of performance of the stack.

As described above, the controller 10 may control the opening direction of each valve based on the temperature of the stack 100 detected by the temperature sensor 20 to switch the air supply direction. However, in some cases, the controller 10 may control the air supply direction to be switched periodically using the timer 30 provided in the controller 10.

Hereinafter, still another implementation of a fuel cell according to the present disclosure will be described.

In the above-described implementations, either the fuel supply direction is switched or the air supply direction is switched to mitigate local overheating in the stack. However, in the implementation described below, the supply directions of the fuel and the air are simultaneously switched so as to remove impurities accumulated in the stack and to simultaneously cool the stack down to a particular temperature.

Figure 7:
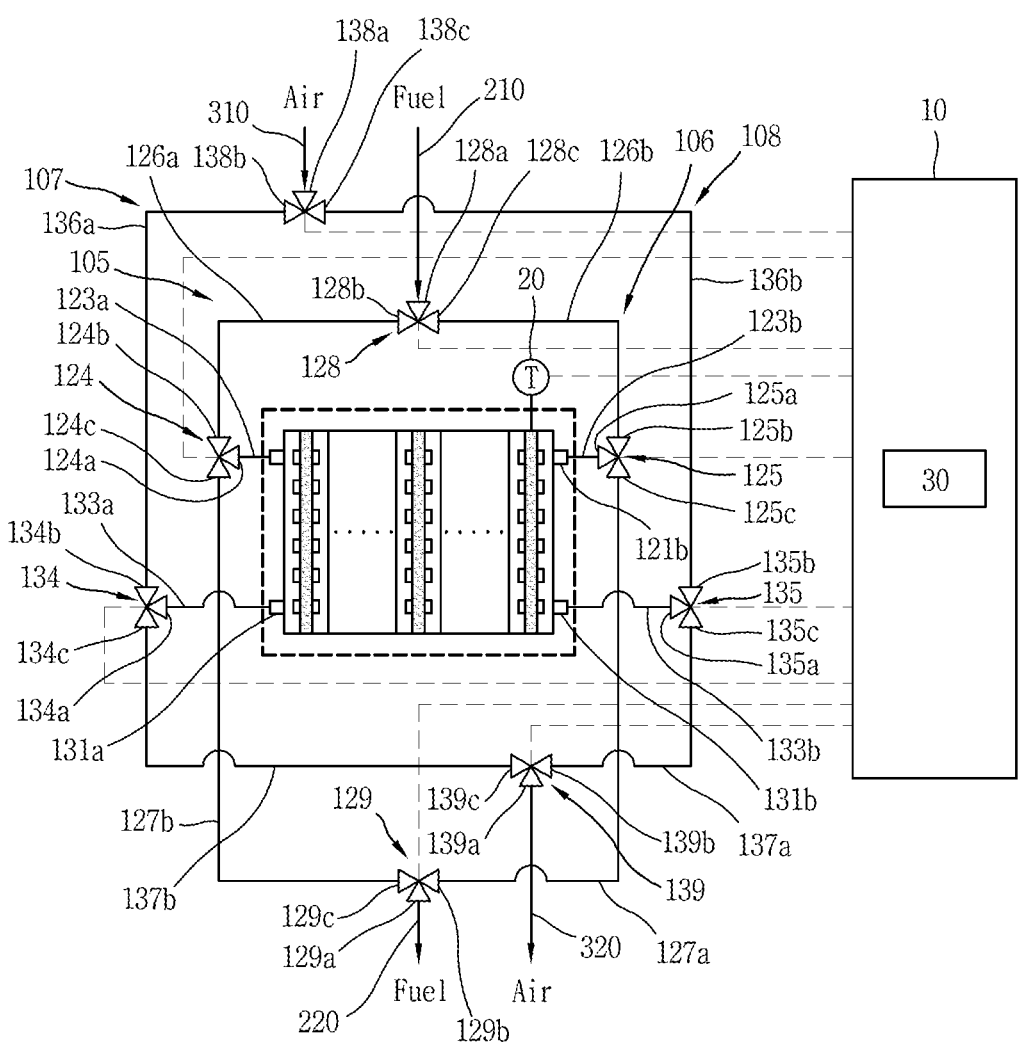
FIG. 7 is a diagram illustrating an example of the fuel feeder and the air feeder for switching the supply directions of the fuel and the air in the fuel cell stack according to FIG. 1.

As illustrated in the example of FIG. 7, the fuel feeder 105, 106 and the air feeder 107, 108 connected to the fuel electrode 102 and the air electrode 103, respectively, and the fuel switching parts (123a,123b), (124,124a,124b,124c), (125,125a,125b,125c), (126a,126b), (127a,127b), (128, 128a,128b,128c), (129,129a,129b,129c), and the air switching parts (133a,133b) (134,134a,134b,134c), (135,135a, 135b,135c), (136a,136b), (137a,137b), (138,138a,138b, 138c), and (139,139a,139b,139c) may be configured by combining the foregoing implementations.

In such scenarios, the basic configuration and operation are similar to those of the foregoing two implementations, so detailed description thereof will be omitted. However, according the implementation of FIG. 7, the flow directions of the fuel and the air may be adjusted to a forward or reverse direction as needed, thereby effectively coping with the local overheating phenomenon in the stack.

For example, in situations where a rated power operation is utilized more often than a high power operation, when the flow direction of the air supplied to the air electrode 103 is maintained in one direction, the surroundings of the second fuel inlet/outlet port 121b of the fuel electrode 102 may be locally overheated due to being blocked by accumulated impurities. In such situations, the fuel supply direction may be switched during times of overheating by using the temperature sensor 20, or periodically switched using the timer 30. This may help remove the impurities accumulated in the vicinity of the second fuel inlet/outlet port 121b, thereby enhancing the performance of the fuel cell stack.

Figure 8:
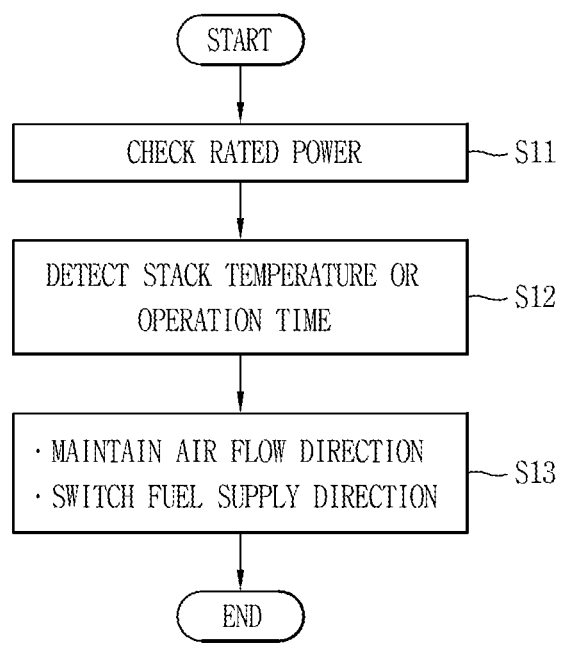
FIGS. 8 to 12 are diagrams illustrating examples of switching the supply directions of the fuel and the air, respectively, in the fuel cell stack according to FIG. 1.

To this end, as illustrated in the example of FIG. 8, it is determined whether the power operation is a rated power operation (S11). Also, a temperature of the stack is detected using a temperature sensor or a switching time point is detected using a timer (S12). When the switching time point is detected, a fuel supply direction may be switched while maintaining an air supply direction (S13).

As such, if the stack is not excessively overheated due to a large number of rated power operations, then the stack may be maintained at a consistent temperature, for example by using a cooling device provided to enclose the stack 100.

When impurities are not accumulated in the stack (e.g., by virtue of high purity of the hydrogen fuel and/or a purge control mechanism), then in some implementations, the fuel cell may not switch the direction of the fuel supply. However, if high power operation is utilized more than a rated power operation, then a temperature difference between the unit cells constituting the stack 100 may further increase. Therefore, in such scenarios, the temperature difference between the unit cells may be reduced by periodically switching the air supply direction or switching the air supply direction during turning on or off the fuel cell, thereby enhancing performance of the stack.

Figure 9:
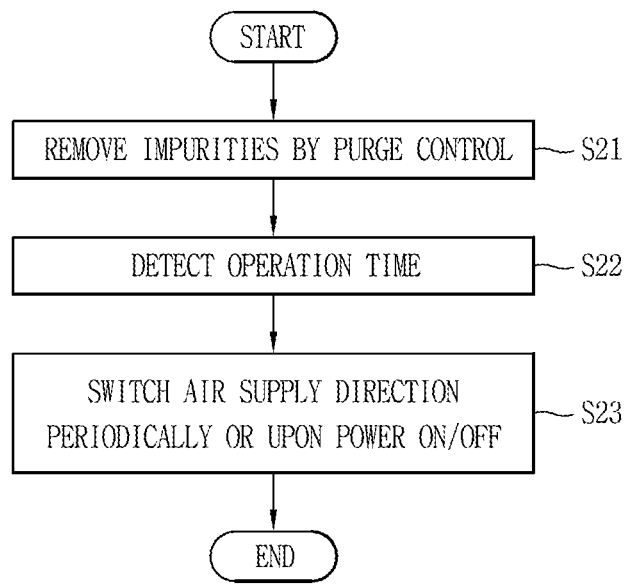

As an example, as illustrated in FIG. 9, a purge control mechanism is performed (S21), and it is determined using a timer whether or not switching is to be performed (S22). When switching is to be performed according to the determination, the air supply direction may be switched periodically or in every operation of turning on or off the fuel cell (S23).

On the other hand, when the temperature difference between the unit cells is large and impurities are contained in the fuel, the performance of the stack may be further improved by changing both the fuel supply direction and the air supply direction periodically or in every operation of turning on or off the fuel cell.

Figure 10:
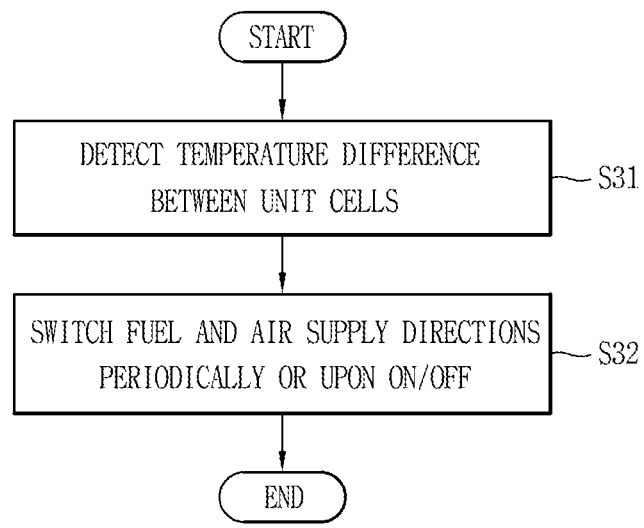
Figure 11:
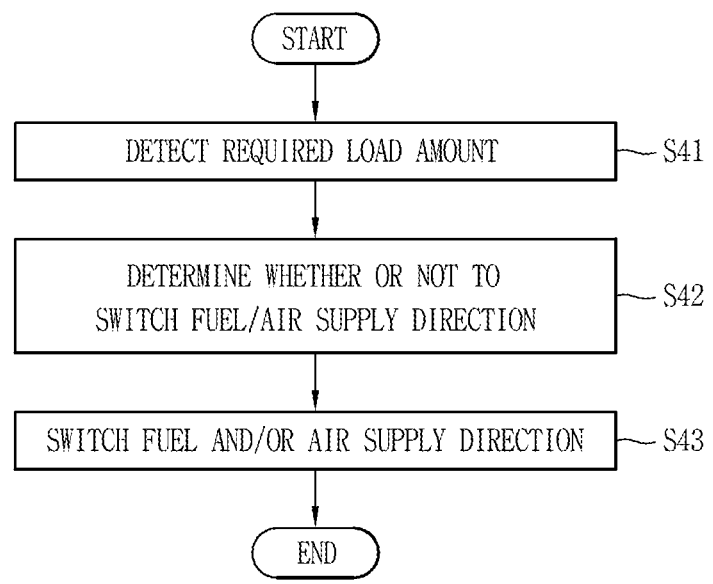

To this end, as illustrated in the example of FIG. 10, the temperature difference between the unit cells may be detected using the temperature sensor 20 (S31). When the temperature difference is greater than a threshold value, the fuel feeder and the air feeder may be controlled to switch both the fuel and air supply directions (S32).

Meanwhile, the fuel cell according to the present disclosure may switch the supply directions of the fuel and the air according to a variation of a load applied to the stack.

For example, when the fuel cell according to the present disclosure is applied to a vehicle or other machine having a large load variation, a load variation detector, such as a wattmeter, provided in a system of the fuel cell may be used to measure a load amount required for the fuel cell. Accordingly, it may be determined whether the flow directions of the fuel and the air should be switched. When the switching is necessary according to the determination, the supply directions of the fuel and the air may be switched.

For example, the detected load amount may be checked (S41), and it may be determined whether to switch the supply direction of the fuel or air or the supply directions of the fuel and the air (S42). According to the determination, the supply directions of the fuel and the air may be switched by adjusting various valves, thereby enhancing the performance of the stack.

Figure 12:
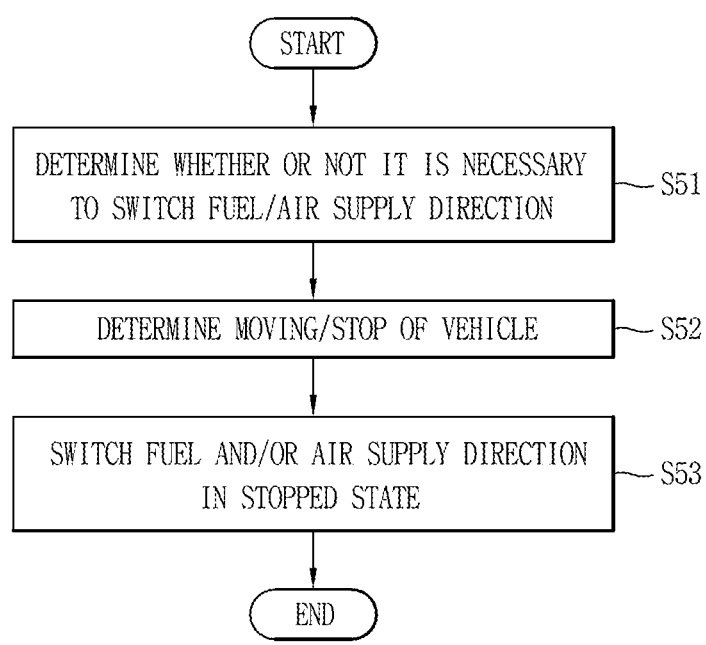

In addition, when the flow directions of the fuel and the air are switched during operation of a machine (e.g., operation of a vehicle), the performance of the stack may be lowered due to collision between fluids. Therefore, as illustrated in FIG. 12, it may be determined whether to switch the supply directions of the fuel and the air before the switching is carried out (S51). In some scenarios, various sensors provided in the machine (e.g., a vehicle) may be used to determine whether machine is in a particular operation state (e.g., whether the vehicle is in a driving state or in a stopped state) (S52). As an example, when the vehicle is in the stopped state, the flow directions of the fuel and the air may be switched (S53). Thus, the performance of the fuel cell may be enhanced by preventing the collision between the fluids due to the switching of the supply directions of the fuel or the air during the travel of the vehicle.

On the other hand, when the fuel cell according to the present disclosure is implemented in a stationary machine, such as a generator, the switching operation may be different. For example, if such a stationary machine is usually operated for long periods of time, then the switching of the fuel or air may be more constrained. For example, the fuel and air flow directions may not be switched while the generator is operating, and may be switched when the operation of the generator is stopped, which may result in preventing in advance deterioration of the performance of the fuel cell due to the collision between the fluids.

The above-described implementations are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A fuel cell, comprising:
a stack comprising:
an electrolyte membrane;
a fuel electrode that is disposed on a first side of the electrolyte membrane, the fuel electrode comprising a first fuel port and a second fuel port that are communicative with each other via a fuel flow path; and
an air electrode disposed on a second side, opposite the first side, of the electrolyte membrane, and comprising a first air port and a second air port that are communicative with each other via an air flow path;
a first fuel feeder communicative with the first fuel port;
a second fuel feeder communicative with the second fuel port;
a first air feeder communicative with the first air port;
a second air feeder communicative with the second air port;
a fuel switching unit provided between the first fuel feeder and the second fuel feeder and configured to switch a fuel supply direction to a first direction from the first fuel feeder to the second fuel feeder, or reversely to a second direction from the second fuel feeder to the first fuel feeder; and
an air switching unit provided between the first air feeder and the second air feeder and configured to switch an air supply direction to a third direction from the first air feeder to the second air feeder, or reversely to a fourth direction from the second air feeder to the first air feeder,
wherein the first fuel port of the stack is connected to a first end of a first fuel pipe, and the second fuel port of the stack is connected to a first end of a second fuel pipe,
wherein a first fuel switching valve is provided on a second end of the first fuel pipe and a first fuel supply pipe and a second fuel discharge pipe are connected to the first fuel switching valve,
wherein a second fuel switching valve is provided on a second end of the second fuel pipe and a second fuel supply pipe and a first fuel discharge pipe are connected to the second fuel switching valve,
wherein the first fuel supply pipe and the second fuel supply pipe are connected to a fuel supply valve that is configured to selectively direct a fuel supply direction,
wherein the first fuel discharge pipe and the second fuel discharge pipe are connected to a fuel discharge valve that is configured to selectively direct a fuel discharge direction,
wherein the fuel supply valve and the fuel discharge valve are configured to be jointly controlled,
wherein the first air port of the stack is connected to a first end of a first air pipe, and the second air port of the stack is connected to a first end of a second air pipe,
wherein a first air switching valve is provided on a second end of the first air pipe, and a first air supply pipe and a second air discharge pipe are connected to the first air switching valve,
wherein a second air switching valve is provided on a second end of the second air pipe, and a second air supply pipe and a first air discharge pipe are connected to the second air switching valve,
wherein the first air supply pipe and the second air supply pipe are connected to an air supply valve that is configured to selectively direct an air supply direction,
wherein the first air discharge pipe and the second air discharge pipe are connected to an air discharge valve that is configured to selectively direct an air discharge direction, and
wherein the air supply valve and the air discharge valve are configured to be jointly controlled.

2. The fuel cell of claim 1, wherein the first fuel feeder and the second fuel feeder share at least a portion of a flow path, and
wherein the fuel switching unit is located on the at least the portion of the flow path shared by the first fuel feeder and the second fuel feeder.

3. The fuel cell of claim 1, wherein the first air feeder and the second air feeder share at least a portion of a flow path, and
wherein the air switching unit is located on the at least the portion of the flow path shared by the first air feeder and the second air feeder.

4. The fuel cell of claim 1, wherein the stack is provided with a cooling unit at an outside thereof, and the cooling unit is configured to be controlled to cooperatively operate with at least one of the fuel switching unit or the air switching unit.

5. The fuel cell of claim 1, further comprising at least one processor electrically connected to the first feeder and the second feeder to and configured to switch a fuel supply direction and an air supply direction to a direction toward the first feeder or the second feeder.

6. The fuel cell of claim 5, further comprising a load variation detecting unit configured to detect a variation of a load that is applied to the stack,
wherein the load variation detecting unit is electrically connected to the at least one processor and configured to cooperatively operate with at least one of the fuel switching unit or the air switching unit.

7. The fuel cell of claim 5, further comprising a temperature detecting unit configured to detect heat generated from the stack,
wherein the temperature detecting unit is electrically connected to the at least one processor and is configured to cooperatively operate with at least one of the fuel switching unit or the air switching unit.

8. The fuel cell of claim 5, further comprising a timer configured to determine a time during which the fuel or the air is supplied from the fuel switching unit or the air switching unit in a corresponding direction,
wherein the timer is electrically connected to the at least one processor and is configured to cooperatively operate with at least one of the fuel switching unit or the air switching unit.

9. The fuel cell of claim 5, further comprising a flow channel comprising at least one pipe connected in a closed loop shape to an inlet and to an outlet of the stack, the at least one pipe configured to supply or discharge the fuel.

10. The fuel cell of claim 9, further comprising a switching valve that is provided at a middle portion of the flow channel comprising the at least one pipe, the switching valve configured to control the fuel supply direction and a fuel discharge direction.

11. The fuel cell of claim 10, further comprising an air supply unit configured to:
supply air in the stack; and switch the air supply direction under control of the at least one processor.

\* \* \* \* \*